US010326120B2

(12) United States Patent
Nishikawa et al.

(10) Patent No.: US 10,326,120 B2
(45) Date of Patent: Jun. 18, 2019

(54) SEPARATOR FOR NONAQUEOUS ELECTROLYTE BATTERY, NONAQUEOUS ELECTROLYTE BATTERY, AND METHOD FOR PRODUCING NONAQUEOUS ELECTROLYTE BATTERY

(71) Applicant: TEIJIN LIMITED, Osaka-shi, Osaka (JP)

(72) Inventors: Satoshi Nishikawa, Yamaguchi (JP); Takashi Yoshitomi, Yamaguchi (JP)

(73) Assignee: TEIJIN LIMITED, Osaka (JP)

( * ) Notice: Subject to any disclaimer, the term of this patent is extended or adjusted under 35 U.S.C. 154(b) by 329 days.

(21) Appl. No.: 14/413,516

(22) PCT Filed: Jul. 30, 2013

(86) PCT No.: PCT/JP2013/070537
§ 371 (c)(1),
(2) Date: Jan. 8, 2015

(87) PCT Pub. No.: WO2014/021289
PCT Pub. Date: Feb. 6, 2014

(65) Prior Publication Data
US 2015/0200387 A1 Jul. 16, 2015

(30) Foreign Application Priority Data
Jul. 30, 2012 (JP) ................. 2012-168988

(51) Int. Cl.
*H01M 2/14* (2006.01)
*H01M 2/16* (2006.01)
*H01M 10/052* (2010.01)
*H01M 10/058* (2010.01)
*H01M 10/0585* (2010.01)

(52) U.S. Cl.
CPC ......... *H01M 2/1686* (2013.01); *H01M 2/145* (2013.01); *H01M 2/1653* (2013.01); *H01M 10/052* (2013.01); *H01M 10/058* (2013.01); *H01M 10/0585* (2013.01); *H01M 2/14* (2013.01); *H01M 2/16* (2013.01); *Y10T 29/4911* (2015.01)

(58) Field of Classification Search
None
See application file for complete search history.

(56) References Cited

U.S. PATENT DOCUMENTS

| 6,558,846 B1* | 5/2003 | Tsushima | H01M 4/131 429/231.1 |
|---|---|---|---|
| 2002/0197413 A1 | 12/2002 | Daido et al. | |
| 2003/0003363 A1* | 1/2003 | Daido | H01M 2/14 429/231.95 |
| 2004/0053122 A1* | 3/2004 | Sugiyama | H01M 2/1653 429/144 |
| 2008/0131783 A1* | 6/2008 | Choi | H01M 4/134 429/232 |
| 2010/0068612 A1* | 3/2010 | Nishikawa | H01M 2/145 429/129 |
| 2011/0143185 A1* | 6/2011 | Nishikawa | H01M 2/162 429/145 |
| 2011/0293976 A1* | 12/2011 | Chiba | H01M 2/1653 429/94 |
| 2013/0017432 A1* | 1/2013 | Roumi | H01M 2/1686 429/145 |
| 2015/0030907 A1* | 1/2015 | Mitsuoka | H01M 2/145 429/145 |

FOREIGN PATENT DOCUMENTS

| JP | 2000-223107 A | 8/2000 |
|---|---|---|
| JP | 2004-111160 A | 4/2004 |
| JP | 2007063547 A | 3/2007 |
| JP | 4127989 B2 | 7/2008 |
| JP | 2011225736 A | 11/2011 |
| JP | 2011-249240 A | 12/2011 |
| JP | 2012-155914 A | 8/2012 |
| WO | 01/67536 A1 | 9/2001 |
| WO | 2011/111365 A1 | 9/2011 |
| WO | 2012/081556 A1 | 6/2012 |

OTHER PUBLICATIONS

International Search Report of PCT/JP2013/070537 dated Aug. 27, 2013 [PCT/ISA/210].

* cited by examiner

*Primary Examiner* — Jeremiah R Smith
(74) *Attorney, Agent, or Firm* — Sughrue Mion, PLLC

(57) ABSTRACT

Provided is a separator for a nonaqueous electrolyte battery, including a porous substrate and an adhesive porous layer that is provided on one side or both sides of the porous substrate and contains an adhesive resin. The separator has a thermal expansion coefficient of more than 0% and 10% or less in the width direction when heat-treated at 105° C. for 30 minutes.

7 Claims, No Drawings

SEPARATOR FOR NONAQUEOUS ELECTROLYTE BATTERY, NONAQUEOUS ELECTROLYTE BATTERY, AND METHOD FOR PRODUCING NONAQUEOUS ELECTROLYTE BATTERY

CROSS REFERENCE TO RELATED APPLICATIONS

This application is a National Stage of International Application No. PCT/JP2013/070537, filed Jul. 30, 2013 (claiming priority based on Japanese Patent Application No. 2012-168988, filed Jul. 30, 2012), the contents of which are incorporated herein by reference in their entirety.

TECHNICAL FIELD

The present invention relates to a separator for a nonaqueous electrolyte battery, a nonaqueous electrolyte battery, and a method for producing a nonaqueous electrolyte battery.

BACKGROUND ART

Nonaqueous electrolyte batteries, such as lithium ion secondary batteries, have been widely used as power sources for portable electronic devices such as laptop computers, mobile phones, digital cameras, and camcorders.

In recent years, with the reduction in size and weight of portable electronic devices, outer casings of nonaqueous electrolyte batteries have been reduced in weight. As outer casing materials, cans made of aluminum have been developed to replace cans made of stainless steel, and further packs formed from an aluminum laminate film have been developed to replace metal cans.

However, packs formed from an aluminum laminate film are soft. Therefore, in a battery using such a pack as the outer casing material (soft pack battery), a gap is likely to be formed between an electrode and a separator due to an external shock or the expansion/contraction of electrodes upon charging and discharging. This results in the problem of reduced cycle life.

In order to solve the problems mentioned above, techniques for enhancing adhesion between electrodes and a separator have been proposed.

As one of such techniques, a separator including a polyolefin microporous membrane and a porous layer made of a polyvinylidene fluoride resin (hereinafter referred to as "PVdF layer") formed thereon is known (see, e.g., Patent Document 1).

When placed on an electrode and hot-pressed, the separator can adhere well to the electrode via the PVdF layer. As a result, the cycle life of a soft pack battery can be improved.

PRIOR ART DOCUMENTS

Patent Documents

Patent Document 1: Japanese Patent No. 4127989

SUMMARY OF THE INVENTION

Problems that the Invention is to Solve

As mentioned above, Patent Document 1 proposes a separator having excellent adhesion to electrodes. However, the yield of battery production is not discussed.

The invention has been made against the above background. An object of the invention is to provide a separator for a nonaqueous electrolyte battery, which has excellent adhesion to electrodes and allows for battery production with high yield, and also a nonaqueous electrolyte battery that can be produced with high yield.

Means for Solving the Problems

Specific means for solving the problems mentioned above are as follows.

<1> A separator for a nonaqueous electrolyte battery, including a porous substrate and an adhesive porous layer that is provided on one side or both sides of the porous substrate and contains an adhesive resin,
the separator having a thermal expansion coefficient of more than 0% and 10% or less in the width direction when heat-treated at 105° C. for 30 minutes.
<2> The separator for a nonaqueous electrolyte battery according to <1>, wherein the porous substrate has a thermal expansion coefficient of more than 0% and 10% or less in the width direction when heat-treated at 105° C. for 30 minutes.
<3> The separator for a nonaqueous electrolyte battery according to <1> or <2>, wherein the separator has a thermal contraction coefficient of 0% or more and 15% or less in the length direction when heat-treated at 105° C. for 30 minutes.
<4> The separator for a nonaqueous electrolyte battery according to any one of <1> to <3>, wherein the total coat weight of the adhesive porous layer on both sides of the porous substrate is 1.0 g/m$^2$ or more and 3.0 g/m$^2$ or less, and the thickness of the adhesive porous layer on one side of the porous substrate is 0.5 μm or more and 4 μm or less.
<5> The separator for a nonaqueous electrolyte battery according to any one of <1> to <4>, wherein the adhesive resin is a polyvinylidene fluoride resin.
<6> A nonaqueous electrolyte battery including a positive electrode, a negative electrode, and the separator of any one of <1> to <5> for a nonaqueous electrolyte battery disposed between the positive electrode and the negative electrode, an electromotive force thereof being obtained by lithium doping/dedoping.
<7> A method for producing a nonaqueous electrolyte battery, including a laminating step of disposing the separator of any one of <1> to <5> for a nonaqueous electrolyte battery between a positive electrode and a negative electrode to form a laminate; a packaging step of placing the laminate and an electrolyte in an outer casing material to form a package; a hot-pressing step of heating and pressurizing the package at a temperature of 80° C. or more and 100° C. or less in the laminating direction of the positive electrode, the separator for a nonaqueous electrolyte battery, and the negative electrode in the laminate; and a sealing step of sealing the package.

Advantage of the Invention

The invention provides a separator for a nonaqueous electrolyte battery, which has excellent adhesion to electrodes and allows for battery production with high yield, and also a nonaqueous electrolyte battery that can be produced with high yield.

Mode for Carrying Out the Invention

Hereinafter, embodiments of the invention will be described. Incidentally, these descriptions and examples illustrate the invention, and do not limit the scope of the invention.

A numerical range indicated using "to" herein shows a range including the numerical values before and after "to" as the minimum and the maximum, respectively.

<Separator for Nonaqueous Electrolyte Battery>

The separator for a nonaqueous electrolyte battery of the invention (hereinafter sometimes referred to as "separator") includes a porous substrate and an adhesive porous layer. The adhesive porous layer is provided on one side or both sides of the porous substrate and contains an adhesive resin. The separator has a thermal expansion coefficient of more than 0% and 10% or less in the width direction when heat-treated at 105° C. for 30 minutes.

With respect to the separator for a nonaqueous electrolyte battery of the invention, the "width direction" means the direction that is perpendicular to the longitudinal direction of the separator that is produced in an elongated form. The "length direction" means the longitudinal direction of the separator that is produced in an elongated form (so-called machine direction). Hereinafter, "width direction" and "length direction" are sometimes referred to as "TD direction" and "MD direction", respectively. In addition, the expansion of the separator resulting from a heat treatment at 105° C. for 30 minutes is referred to as "thermal expansion", and the percentage of the expansion is referred to as "thermal expansion coefficient." In addition, the contraction of the separator resulting from the heat treatment is referred to as "thermal contraction", and the percentage of the contraction is referred to as "thermal contraction coefficient."

The separator for a nonaqueous electrolyte battery of the invention includes an adhesive porous layer on one side or both sides of the porous substrate, and thus has excellent adhesion to electrodes.

Further, the separator for a nonaqueous electrolyte battery of the invention has a thermal expansion coefficient of more than 0% and 10% or less in the width direction when heat-treated at 105° C. for 30 minutes, and thus allows for battery production with high yield.

When heat-treated at 105° C. for 30 minutes, the separator for a nonaqueous electrolyte battery of the invention expands in the width direction (TD direction) with a thermal expansion coefficient of more than 0% and 10% or less.

When the thermal expansion coefficient is 0% or less, that is, when the heat treatment does not cause a length change in the width direction or causes contraction in the width direction, in the production of a battery, the battery may have a region where a positive electrode and a negative electrode face each other with no separator between the electrodes, possibly causing a short circuit in the battery. This results in an increase in the number of products that fail the inspection, leading to a decrease in the yield of battery production.

Meanwhile, when the thermal expansion coefficient is more than 10%, the separator may be wrinkled in the production of a battery, causing a short circuit in the battery. This results in an increase in the number of products that fail the inspection, leading to a decrease in the yield of battery production.

In the separator for a nonaqueous electrolyte battery of the invention, the thermal expansion coefficient is more than 0% and 10% or less. Thus, in the production of a battery, it is unlikely that the battery has a region where the electrodes face each other with no separator between them, or that the separator is wrinkled. Accordingly, a short circuit is unlikely to occur in the battery. As a result, the yield of battery production is high.

The lower limit of the thermal expansion coefficient is preferably 0.5% or more, more preferably 0.8% or more, and still more preferably 1% or more. In addition, the upper limit of the thermal expansion coefficient is preferably 8% or less, more preferably 5% or less, still more preferably 3% or less, and particularly preferably 2% or less.

As methods for controlling the thermal expansion coefficient of the separator for a nonaqueous electrolyte battery, the selection of a porous substrate that expands in the width direction within a specific range as a result of the heat treatment, the adjustment of the coat weight or thickness of the adhesive porous layer, and the like can be mentioned, for example.

In the separator for a nonaqueous electrolyte battery of the invention, the length change in the length direction (MD direction) as a result of the heat treatment is not particularly limited, and the separator may expand or contract in the length direction as a result of the heat treatment. The separator usually contracts in the length direction as a result of the heat treatment.

It is preferable that the separator for a nonaqueous electrolyte battery of the invention has a thermal contraction coefficient of 0% or more and 15% or less in the length direction when heat-treated at 105° C. for 30 minutes. When the thermal contraction coefficient in the length direction is within this range, battery characteristics as a battery are excellent. From such a point of view, the thermal contraction coefficient in the length direction is more preferably 10% or less, and still more preferably 5% or less.

As methods for controlling the thermal contraction coefficient of the separator for a nonaqueous electrolyte battery in the length direction, the selection of a porous substrate that is unlikely to contract in the length direction as a result of the heat treatment, the adjustment of the coat weight or thickness of the adhesive porous layer, and the like can be mentioned, for example.

In the invention, the thermal expansion coefficient (%) of the separator for a nonaqueous electrolyte battery in the width direction (TD direction) is measured by the following method. The thermal contraction coefficient (%) in the length direction (MD direction) can also be measured at the same time, so it will also be described.

First, from a separator for a nonaqueous electrolyte battery produced in an elongated form, a sample for measurement having a size of 18 cm (MD direction)×6 cm (TD direction) is cut out.

Four marks (point A, point B, point C, and point D) are given to the sample for measurement as follows. That is, on a line bisecting the TD direction, two points that are 2 cm and 17 cm from one end are marked (point A and point B). In addition, on a line bisecting the MD direction, two points that are 1 cm and 5 cm from one end are marked (point C and point D). (Accordingly, the length between A and B is 15 cm, while the length between C and D is 4 cm.)

Then, a position between the end nearest to the point A and the point A is clipped. In an oven maintained at an inside temperature of 105° C., the sample is hung such that the MD direction is the direction of gravity, and allowed to stand under no tension for 30 minutes. After a lapse of 30 minutes, the sample is taken out from the oven, and the lengths between A and B and between C and D are measured. The thermal expansion coefficient (%) and the thermal contraction coefficient (%) are calculated by the following equations.

Thermal expansion coefficient (%) in the width direction (TD direction) =
100×(length between C and D after heat treatment −
length between C and D before heat treatment)/
(length between C and D before heat treatment) =
100×(length between C and D after heat treatment − 4)/4

Thermal contraction coefficient (%) in the length direction (MD direction) =
100×(length between A and B before heat treatment −
length between A and B after heat treatment)/
(length between A and B before heat treatment) =
100×(15 − length between A and B after heat treatment)/15

Hereinafter, the layers and components forming the separator for a nonaqueous electrolyte battery of the invention will be described.

[Porous Substrate]

The porous substrate in the invention means a substrate having pores or voids inside. Examples of such substrates include microporous membranes; porous sheets made of a fibrous material, such as nonwoven fabrics and paper-like sheets; and composite porous sheets including such a microporous membrane or porous sheet as well as one or more other porous layers laminated thereon. Incidentally, a microporous membrane means a membrane having a large number of micropores inside and configured such that the micropores are connected to allow gas or liquid to pass from one side to the other side.

The material forming the porous substrate may be an organic material or an inorganic material as long as it is an electrically insulating material.

In terms of imparting a shutdown function to the porous substrate, it is preferable that the material forming the porous substrate is a thermoplastic resin. Here, a shutdown function refers to the following function: upon an increase in battery temperature, a constituent material melts and closes pores of the porous substrate, thereby blocking the movement of ions to prevent the battery from thermal runaway. As the thermoplastic resin, a thermoplastic resin having a melting point of less than 200° C. is suitable, and polyolefins are particularly preferable.

As a porous substrate using a polyolefin, a polyolefin microporous membrane is preferable.

As the polyolefin microporous membrane, among polyolefin microporous membranes that have been applied to conventional separators for a nonaqueous electrolyte battery, one having sufficient dynamic properties and ion permeability can be preferably used.

In terms of developing a shutdown function, it is preferable that the polyolefin microporous membrane contains polyethylene, and it is preferable that the polyethylene content is 95 mass % or more.

In addition, in terms of imparting heat resistance that prevents the membrane from easily breaking when exposed to high temperatures, a polyolefin microporous membrane containing polyethylene and polypropylene is preferable. An example of such a polyolefin microporous membrane is a microporous membrane in which both polyethylene and polypropylene are present in one layer. In terms of achieving both a shutdown function and heat resistance, it is preferable that the microporous membrane contains 95 mass % or more polyethylene and 5 mass % or less polypropylene. In addition, in terms of achieving both a shutdown function and heat resistance, it is also preferable that the polyolefin microporous membrane has a laminated structure including two or more layers, in which at least one layer contains polyethylene, while at least one layer contains polypropylene.

It is preferable that the polyolefin contained in the polyolefin microporous membrane has a weight average molecular weight of 100,000 to 5,000,000. When the weight average molecular weight is 100,000 or more, sufficient dynamic properties can be ensured. Meanwhile, a weight average molecular weight of 5,000,000 or less leads to excellent shutdown characteristics and also facilitates membrane formation.

A polyolefin microporous membrane can be produced by the following methods, for example. That is, according to one method, a molten polyolefin resin is extruded from a T-die, formed into a sheet, subjected to a crystallization treatment, stretched, and further heat-treated to give a microporous membrane. Alternatively, according to another method, a polyolefin resin melted together with a plasticizer such as liquid paraffin is extruded from a T-die, cooled and formed into a sheet, stretched, and, after the extraction of the plasticizer, heat-treated to give a microporous membrane.

Examples of porous sheets made of a fibrous material include porous sheets made of a fibrous material, such as polyesters such as polyethylene terephthalate; polyolefins such as polyethylene and polypropylene; heat-resistant polymers such as aromatic polyamide, polyimide, polyethersulfone, polysulfone, polyether ketone, and polyetherimide; and the like. Examples also include porous sheets made of a mixture of these fibrous materials.

A composite porous sheet may be configured to include a microporous membrane or a porous sheet made of a fibrous material as well as a functional layer laminated thereon. The composite porous sheet is preferable in that further functions can be imparted by the functional layer. In terms of imparting heat resistance, for example, the functional layer may be a porous layer made of a heat-resistant resin or a porous layer made of a heat-resistant resin and an inorganic filler. The heat-resistant resin may be one or more kinds of heat-resistant polymers selected from aromatic polyamide, polyimide, polyethersulfone, polysulfone, polyether ketone, and polyetherimide. As the inorganic filler, metal oxides such as alumina and metal hydroxides such as magnesium hydroxide can be preferably used. Incidentally, examples of compositing techniques include a method in which a microporous membrane or a porous sheet is coated with a functional layer, a method in which a microporous membrane or a porous sheet and a functional layer are joined together using an adhesive, and a method in which a microporous membrane or a porous sheet and a functional layer are bonded together by thermocompression.

In the invention, in terms of obtaining excellent dynamic properties and internal resistance, it is preferable that the porous substrate has a thickness within a range of 5 μm to 25 μm.

In terms of preventing short circuits in a battery and obtaining sufficient ion permeability, it is preferable that the porous substrate has a Gurley number (JIS P8117) within a range of 50 sec/100 cc to 800 sec/100 cc.

In terms of improving the production yield, it is preferable that the porous substrate has a puncture resistance of 300 g or more.

In the invention, it is preferable that the porous substrate has a thermal expansion coefficient of more than 0% and 10% or less in the width direction (TD direction) when heat-treated at 105° C. for 30 minutes. When the thermal expansion coefficient of the porous substrate in the width direction is within this range, the thermal expansion coefficient of the separator for a nonaqueous electrolyte battery in the width direction can be easily controlled to be more than 0% and 10% or less.

The lower limit of the thermal expansion coefficient of the porous substrate in the width direction is more preferably 0.5% or more, still more preferably 0.8% or more, and particularly preferably 1% or more. The upper limit of the thermal expansion coefficient of the porous substrate in the width direction is more preferably 8% or less, still more preferably 5% or less, yet more preferably 3% or less, and particularly preferably 2% or less.

The thermal expansion coefficient (%) of the porous substrate in the width direction is determined by the same measurement method as the measurement method for the thermal expansion coefficient (%) of the separator for a nonaqueous electrolyte battery in the width direction.

As methods for controlling the thermal expansion coefficient of the porous substrate in the width direction, the selection of materials to be used for the porous substrate, the adjustment of stretching conditions, heat setting conditions, etc., and the like can be mentioned, for example. It is also possible to select a commercially available porous substrate that satisfies the above-mentioned thermal expansion coefficient in the width direction.

[Adhesive Porous Layer]

The adhesive porous layer in the invention is a layer having a large number of micropores inside and configured such that the micropores are connected to allow gas or liquid to pass from one side to the other side.

In addition, the adhesive porous layer in the invention is provided as the outermost layer(s) of the separator on one side or both sides of the porous substrate. When the separator and an electrode are stacked and hot-pressed, the adhesive porous layer can adhere to the electrode.

In terms of providing a battery with excellent cycle characteristics (capacity retention), it is preferable that the adhesive porous layer is present on both sides of the porous substrate rather than only one side. This is because when the adhesive porous layer is present on both sides of the porous substrate, both sides of the separator adhere well to both electrodes via the adhesive porous layer.

It is preferable that the total coat weight of the adhesive porous layer on both sides of the porous substrate is 1.0 g/m² to 3.0 g/m². Here, with respect to "the total coat weight on both sides of the porous substrate" of the adhesive porous layer, in the case where the adhesive porous layer is provided on one side of the porous substrate, it refers to the coat weight on one side, while in the case where the adhesive porous layer is provided on both sides of the porous substrate, it refers to the total of the coat weights on both sides.

When the coat weight is 1.0 g/m² or more, this leads to excellent adhesion to electrodes and provides a battery with good cycle characteristics. Meanwhile, when the coat weight is 3.0 g/m² or less, this leads to excellent ion permeability and provides a battery with good load characteristics, and the thermal expansion coefficient of the separator for a nonaqueous electrolyte battery in the width direction can be easily controlled to be more than 0% and 10% or less.

It is more preferable that the total coat weight of the adhesive porous layer on both sides of the porous substrate is 1.5 g/m² to 2.5 g/m².

The coat weight of the adhesive porous layer on one side of the porous substrate is preferably 0.5 g/m² to 1.5 g/m², and more preferably 0.75 g/m² to 1.25 g/m².

In the case where the adhesive porous layer is provided on both sides of the porous substrate, the difference between the coat weight on one side and the coat weight on the other side is preferably 20% or less of the total coat weight on both sides. When the difference is 20% or less, the separator is resistant to curling. This results in good handleability, and also the problem of decreased cycle characteristics is unlikely to occur.

It is preferable that the thickness of the adhesive porous layer on one side of the porous substrate is 0.5 μm to 4 μm.

When the thickness is 0.5 μm or more, this leads to excellent adhesion to electrodes and provides a battery with good cycle characteristics.

Meanwhile, when the thickness is 4 μm or less, this leads to excellent ion permeability and provides a battery with good load characteristics. In addition, when the thickness is 4 μm or less, the thermal expansion coefficient of the separator for a nonaqueous electrolyte battery in the width direction can be easily controlled to be more than 0% and 10% or less.

The thickness of the adhesive porous layer on one side of the porous substrate is more preferably 1 μm to 3 μm, and still more preferably 1 μm to 2 μm.

In the invention, in terms of ion permeability, it is preferable that the structure of the adhesive porous layer is sufficiently porous. Specifically, it is preferable that the porosity is 30% to 80%. When the porosity is 80% or less, dynamic properties that can withstand the pressing step for bonding to electrodes can be ensured. In addition, when the porosity is 80% or less, the surface porosity is not too high, and sufficient adhesion strength can be ensured. Meanwhile, when the porosity is 30% or more, ion permeability is excellent.

It is preferable that the adhesive porous layer has an average pore size of 10 nm to 200 nm. When the average pore size is 200 nm or less, pore non-uniformity is suppressed, and the bonding points are uniformly scattered, leading to good adhesion. In addition, when the average pore size is 200 nm or less, the migration of ions is uniform, leading to good cycle characteristics and load characteristics. Meanwhile, when the average pore size is 10 nm or more, it is unlikely that when the adhesive porous layer is impregnated with an electrolyte, the resin forming the adhesive porous layer swells and closes the pores to inhibit ion permeability.

The adhesive porous layer may contain a filler made of an inorganic substance or an organic substance and other components. The presence of a filler can improve the slidability and heat resistance of the separator. Examples of inorganic fillers include metal oxides such as alumina and metal hydroxides such as magnesium hydroxide. Examples of organic fillers include acrylic resins.

[Adhesive Resin]

The adhesive resin contained in the adhesive porous layer is not particularly limited as long as it can adhere to electrodes. Preferred examples thereof include polyvinylidene fluoride, polyvinylidene fluoride copolymers, styrene-butadiene copolymers, homopolymers and copolymers of vinyl nitriles such as acrylonitrile and methacrylonitrile, and polyethers such as polyethylene oxide and polypropylene oxide.

The adhesive porous layer may contain only one kind of adhesive resin, or may also contain two or more kinds.

In the invention, in terms of adhesion to electrodes, it is preferable that the adhesive resin contained in the adhesive porous layer is a polyvinylidene fluoride resin.

Examples of polyvinylidene fluoride resins include a homopolymer of vinylidene fluoride (i.e., polyvinylidene fluoride); copolymers of vinylidene fluoride and another copolymerizable monomer (polyvinylidene fluoride copolymers); and mixtures thereof.

Examples of monomers copolymerizable with vinylidene fluoride include tetrafluoroethylene, hexafluoropropylene, trifluoroethylene, trichloroethylene, and vinyl fluoride. They can be used alone, or it is also possible to use two or more kinds.

A polyvinylidene fluoride resin is obtained by emulsion polymerization or suspension polymerization.

It is preferable that the polyvinylidene fluoride resin contains 98 mol % or more vinylidene fluoride as a structural unit. In the case where 98 mol % or more of vinylidene fluoride is present, dynamic properties and heat resistance sufficient for severe hot-pressing conditions can be ensured.

It is preferable that the polyvinylidene fluoride resin has a weight average molecular weight within a range of 300,000 to 3,000,000. When the weight average molecular weight is 300,000 or more, dynamic properties that can withstand the treatment for bonding to electrodes can be ensured for the adhesive porous layer, and sufficient adhesion can be obtained. Meanwhile, when the weight average molecular weight is 3,000,000 or less, viscosity at the time of formation of a coating liquid does not become too high, leading to good formability and crystal formation, resulting in excellent porousness. The weight average molecular weight is more preferably within a range of 300,000 to 2,000,000, still more preferably within a range of 500,000 to 1,500,000, and particularly preferably within a range of 600,000 to 1,000,000.

In terms of cycle characteristics, it is preferable that the polyvinylidene fluoride resin has a fibril diameter within a range of 10 nm to 1,000 nm.

When the adhesive porous layer is impregnated with an electrolyte, the degree of swelling of the resin contained in the adhesive porous layer depends on the kind of resin or the electrolyte composition. In order to suppress defects caused by the swelling of the resin, it is preferable to select a polyvinylidene fluoride resin that is resistant to swelling. For example, a polyvinylidene fluoride resin containing a large amount of copolymer component is prone to swelling, while a polyvinylidene fluoride resin containing 98 mol % or more vinylidene fluoride is resistant to swelling and thus preferable.

In addition, a polyvinylidene fluoride resin is prone to swelling with an electrolyte having a high content of cyclic carbonate, such as ethylene carbonate or propylene carbonate, and a high dielectric constant. However, a polyvinylidene fluoride resin containing 98 mol % or more vinylidene fluoride is relatively resistant to swelling and thus preferable.

[Characteristics of Separator]

In terms of mechanical strength and of energy density as a battery, it is preferable that the separator for a nonaqueous electrolyte battery of the invention has an entire thickness of 5 μm to 35 μm.

In terms of mechanical strength, handleability, and ion permeability, it is preferable that the separator for a nonaqueous electrolyte battery of the invention has a porosity of 30% to 60%.

In terms of achieving a good balance between mechanical strength and membrane resistance, it is preferable that the separator for a nonaqueous electrolyte battery of the invention has a Gurley number (JIS P8117) of 50 sec/100 cc to 800 sec/100 cc.

In terms of ion permeability, in the separator for a nonaqueous electrolyte battery of the invention, it is preferable that the difference between the Gurley number of the porous substrate and the Gurley number of the separator including the porous substrate and an adhesive porous layer provided thereon is not more than 300 sec/100 cc, more preferably not more than 150 sec/100 cc, and still more preferably not more than 100 sec/100 cc.

In terms of the load characteristics of a battery, it is preferable that the separator for a nonaqueous electrolyte battery of the invention has a membrane resistance of 1 ohm-cm$^2$ to 10 ohm-cm$^2$. Membrane resistance herein refers to the resistance of the separator as impregnated with an electrolyte, and is measured by an alternating-current method. The resistance naturally depends on the kind of electrolyte and the temperature, and the above value is a value measured at 20° C. using 1 M LiBF$_4$-propylene carbonate/ethylene carbonate (mass ratio: 1/1) as the electrolyte.

In terms of ion permeability, it is preferable that the separator for a nonaqueous electrolyte battery of the invention has a tortuosity of 1.5 to 2.5.

[Method for Producing Separator]

The separator for a nonaqueous electrolyte battery of the invention can be produced, for example, by a method in which a porous substrate is coated thereon with a coating liquid containing a resin, such as a polyvinylidene fluoride resin, to form a coating layer, and then the resin of the coating layer is solidified, thereby integrally forming an adhesive porous layer on the porous substrate.

The following describes the case where the adhesive porous layer is formed using a polyvinylidene fluoride resin.

An adhesive porous layer made of a polyvinylidene fluoride resin can be formed by the following wet coating method, for example.

The wet coating method is a film formation method including (i) a step of dissolving a polyvinylidene fluoride resin in a suitable solvent to prepare a coating liquid, (ii) a step of coating a porous substrate with the coating liquid, (iii) a step of immersing the porous substrate in a suitable coagulation liquid to induce phase separation and solidify the polyvinylidene fluoride resin, (iv) a step of washing with water, and (v) a step of drying, thereby forming a porous layer on the porous substrate. The detail of the wet coating method suitable for the invention is as follows.

As a solvent that dissolves a polyvinylidene fluoride resin (hereinafter sometimes referred to as "good solvent") used for the preparation of a coating liquid, it is preferable to use a polar amide solvent such as N-methylpyrrolidone, dimethylacetamide, or dimethylformamide.

In terms of forming an excellent porous structure, in addition to the good solvent, it is preferable to mix a phase separation agent that induces phase separation. Examples of phase separation agents include water, methanol, ethanol, propyl alcohol, butyl alcohol, butanediol, ethylene glycol, propylene glycol, and tripropylene glycol. It is preferable that the phase separation agent is added within a range where viscosity suitable for coating can be ensured.

In terms of forming an excellent porous structure, it is preferable that the solvent is a mixed solvent containing 60 mass % or more a good solvent and 40 mass % or less a phase separation agent.

In terms of forming an excellent porous structure, it is preferable that the coating liquid contains the polyvinylidene fluoride resin at a concentration of 3 to 10 mass %.

In the case where a filler or other components are added to the adhesive porous layer, they may be mixed with or dissolved in the coating liquid.

In general, a coagulation liquid contains the good solvent and phase separation agent used for the preparation of a coating liquid and water. In terms of production, it is preferable that the mixing ratio between the good solvent and the phase separation agent is determined according to the mixing ratio in the mixed solvent used for dissolving a polyvinylidene fluoride resin. In terms of the formation of a porous structure and productivity, it is suitable that the concentration of water is 40 mass % to 90 mass %.

The coating of a porous substrate with the coating liquid may be performed using a conventional coating technique, such as a Mayer bar, a die coater, a reverse roll coater, or a gravure coater. In the case where an adhesive porous layer is formed on both sides of the porous substrate, in terms of productivity, it is preferable that both sides of the substrate are simultaneously coated with the coating liquid.

In addition to the wet coating method mentioned above, the adhesive porous layer can also be produced by a dry coating method. Here, the dry coating method is a method in which, for example, a porous substrate is coated with a coating liquid containing a polyvinylidene fluoride resin and a solvent, and then the resulting coating layer is dried to volatilize the solvent away, thereby giving a porous layer. However, as compared with the wet coating method, the dry coating method tends to give a dense coating layer. Accordingly, the wet coating method is more preferable in terms of obtaining an excellent porous structure.

The separator for a nonaqueous electrolyte battery of the invention can also be produced by a method in which an adhesive porous layer is formed as an independent sheet, then the adhesive porous layer is placed on a porous substrate, and they are composited by thermocompression bonding or using an adhesive. The method for producing an adhesive porous layer as an independent sheet may be a method in which a release sheet is coated thereon with a coating liquid containing a resin, then an adhesive porous layer is formed by the wet coating method or dry coating method mentioned above, and the adhesive porous layer is peeled off from the release sheet.

<Nonaqueous Electrolyte Battery>

The nonaqueous electrolyte battery of the invention is a nonaqueous electrolyte battery whose electromotive force is obtained by lithium doping/dedoping, and includes a positive electrode, a negative electrode, and the separator for a nonaqueous electrolyte battery of the invention mentioned above. The nonaqueous electrolyte battery is configured such that a battery element, which includes an electrolyte-impregnated structure having the negative electrode and the positive electrode facing each other via the separator, is enclosed in an outer casing material.

The nonaqueous electrolyte battery of the invention is suitable for a nonaqueous electrolyte secondary battery, particularly a lithium ion secondary battery.

Incidentally, doping means occlusion, support, adsorption, or intercalation, and refers to the phenomenon that lithium ions enter the active material of an electrode such as a positive electrode.

The nonaqueous electrolyte battery of the invention includes, as a separator, the separator for a nonaqueous electrolyte battery of the invention mentioned above, and thus is excellent in terms of adhesion between the electrodes and the separator.

In addition, the nonaqueous electrolyte battery of the invention produced using the separator for a nonaqueous electrolyte battery of the invention is unlikely to short-circuit. This results in a decrease in the number of products that fail the inspection, and thus the production yield is high.

The positive electrode may be configured such that an active material layer containing a positive electrode active material and a binder resin is formed on a collector. The active material layer may further contain an electrically conductive auxiliary.

Examples of positive electrode active materials include lithium-containing transition metal oxides. Specific examples thereof include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$.

Examples of binder resins include polyvinylidene fluoride resins and styrene-butadiene copolymers.

Examples of electrically conductive auxiliaries include carbon materials such as acetylene black, ketjen black, and graphite powder.

Examples of collectors include aluminum foils, titanium foils, and stainless steel foils having a thickness of 5 μm to 20 μm.

In the nonaqueous electrolyte battery of the invention, in the case where the separator includes an adhesive porous layer containing a polyvinylidene fluoride resin, and the adhesive porous layer is disposed on the positive electrode side, because the polyvinylidene fluoride resin has excellent oxidation resistance, a positive electrode active material that can be operated at a high voltage of 4.2 V or more, such as $LiMn_{1/2}Ni_{1/2}O_2$ or $LiCo_{1/3}Mn_{1/3}Ni_{1/3}O_2$, can be easily applied; thus, this is advantageous.

The negative electrode may be configured such that an active material layer containing a negative electrode active material and a binder resin is formed on a collector. The active material layer may further contain an electrically conductive auxiliary.

Examples of negative electrode active materials include materials capable of electrochemically occluding lithium. Specific examples thereof include carbon materials, silicon, tin, aluminum, and Wood's alloy.

Examples of binder resins include polyvinylidene fluoride resins and styrene-butadiene copolymers.

Examples of electrically conductive auxiliaries include carbon materials such as acetylene black, ketjen black, and graphite powder.

Examples of collectors include copper foils, nickel foils, and stainless steel foils having a thickness of 5 μm to 20 μm.

In addition, instead of such a negative electrode, a metal lithium foil may also be used as the negative electrode.

The electrolyte is a solution obtained by dissolving a lithium salt in a nonaqueous solvent.

Examples of lithium salts include $LiPF_6$, $LiBF_4$, and $LiClO_4$.

Examples of nonaqueous solvents include cyclic carbonates such as ethylene carbonate, propylene carbonate, fluoroethylene carbonate, and difluoroethylene carbonate; linear carbonates such as dimethyl carbonate, diethyl carbonate, ethyl methyl carbonate, and fluorine substitutions thereof; and cyclic esters such as γ-butyrolactone and γ-valerolactone. They may be used alone or as a mixture.

As the electrolyte, one obtained by mixing a cyclic carbonate and a linear carbonate in a mass ratio (cyclic carbonate/linear carbonate) of 20/80 to 40/60 and dissolving a lithium salt therein at 0.5 M to 1.5 M is preferable.

Examples of outer casing materials include metal cans and packs formed from an aluminum laminate film.

The shape of batteries may be prismatic, cylindrical, coin-type, etc., and the separator for a nonaqueous electrolyte battery of the invention is suitable for any shape.

<Method for Producing Nonaqueous Electrolyte Battery>

The method for producing a nonaqueous electrolyte battery of the invention includes:

a laminating step of disposing the separator for a non-aqueous electrolyte battery of the invention mentioned above between a positive electrode and a negative electrode to form a laminate;

a packaging step of placing the laminate and an electrolyte in an outer casing material to form a package;

a hot-pressing step of heating and pressurizing the package at a temperature of 80° C. or more and 100° C. or less in the laminating direction of the positive electrode, the separator for a nonaqueous electrolyte battery, and the negative electrode in the laminate; and a sealing step of sealing the package.

According to this method, a nonaqueous electrolyte battery configured such that a battery element, which includes an electrolyte-impregnated structure having a negative electrode and a positive electrode facing each other via the separator of the invention, is enclosed in an outer casing material is obtained.

According to the method of the invention, a nonaqueous electrolyte battery that is unlikely to short-circuit is produced. This results in a decrease in the number of products that fail the inspection, and thus the yield of battery production is high.

[Laminating Step]

The laminating step is a step in which the separator is disposed between a positive electrode and a negative electrode to form a laminate.

This step may use a technique in which at least one layer of positive electrode, at least one layer of separator, and at least one layer of negative electrode are laminated in this order (so-called stacking technique), or a technique in which a positive electrode, a separator, a negative electrode, and a separator are staked in this order and rolled in the length direction.

[Packaging Step]

The packaging step is a step in which the laminate and an electrolyte are placed in an outer packaging material to form a package (a structure including the laminate and an electrolyte placed in an outer packaging material). In this step, the insertion of the laminate into the outer packaging material may be followed by the injection of an electrolyte, the injection of an electrolyte into the outer packaging material may be followed by the insertion of the laminate, or the insertion of the laminate and the injection of an electrolyte into the outer packaging material may be performed together. It is also possible that the laminate is impregnated with an electrolyte and then inserted into the outer packaging material.

In this step, it is preferable that the inside of the package containing the laminate and an electrolyte is under a vacuum condition.

As the electrolyte, those mentioned above for the non-aqueous electrolyte battery of the invention are preferable.

Examples of outer casing materials include metal cans made of stainless steel or aluminum and packs formed from an aluminum laminate film.

[Hot-Pressing Step]

The hot-pressing step is a step in which the package is heated and pressurized. The direction of hot pressing should be the laminating direction of the positive electrode, the separator, and the negative electrode in the laminate. As a result of this step, the electrodes and the separator are bonded together.

The temperature of hot pressing should be 80° C. or more and 100° C. or less. Within this temperature range, adhesion between the electrodes and the separator is excellent, and also the separator can moderately expand in the width direction. Therefore, a short circuit is unlikely to occur in the battery.

When the temperature of hot pressing is less than 80° C., the bonding between the electrodes and the separator may be insufficient, or the separator may not expand in the width direction, causing a short circuit in the battery.

Meanwhile, when the temperature of hot pressing is more than 100° C., the separator may be wrinkled, causing a short circuit in the battery.

The pressure of hot pressing is not particularly limited, but it is preferable that the load per $cm^2$ of electrode is 0.5 kg or more and 40 kg or less.

The duration of hot pressing is not particularly limited, but is preferably 0.5 minutes or more and 60 minutes or less.

As a method for hot pressing, for example, it is possible to apply a technique in which the package is sandwiched between hot plates and thus heated and pressurized, or a technique in which the package is passed between a pair of opposite hot rollers and thus heated and pressurized.

[Sealing Step]

The sealing step is a step in which the package is sealed to enclose the laminate and the electrolyte in the outer casing material.

As a method for sealing, for example, it is possible to apply a technique in which the opening of the outer casing material is bonded using an adhesive, or a technique in which the opening of the outer casing material is heated and pressurized to bond it by thermocompression.

Incidentally, the hot-pressing step and the sealing step do not have to be independent steps. It is also possible that as a result of hot pressing, the electrodes and the separator are bonded together, and the opening of the outer casing material is bonded by thermocompression at the same time.

It is also possible that the sealing step is followed by the hot-pressing step.

Needless to say, in the method of the invention, in addition to the electrodes and the separator, various kinds of parts useful for the battery are mounted. Various kinds of parts may be mounted in the steps mentioned above, may be mounted between the steps mentioned above, or may be mounted after all of the steps mentioned above.

EXAMPLES

Hereinafter, the invention will be described in further detail with reference to examples. The materials, the amounts to be used, the proportions, the procedures, and the like shown in the following examples may be suitably changed without deviating from the gist of the invention. Accordingly, the scope of the invention should not be construed as being limited to the following specific examples.

<Measurement Methods>

The measurement methods applied in the examples of the invention and the comparative examples are as follows.

[Film Thickness]

The thicknesses (μm) of a separator and a porous substrate were each determined as the arithmetic average of values measured at 20 points using a contact thickness meter (LITEMATIC manufactured by Mitutoyo Corporation). A cylindrical terminal 5 mm in diameter was used as a measuring terminal, and it was adjusted to apply a load of 7 g during the measurement.

With respect to the thickness of an adhesive porous layer, the porous substrate thickness was subtracted from the separator thickness to determine the total thickness on both sides, and half the total thickness was taken as the thickness on one side.

[Areal Weight]

A 10 cm×10 cm sample was cut out and measured for mass, and the mass was divided by the area to determine the areal weight (mass per $m^2$).

[Coat Weight of Adhesive Porous Layer]

A separator was cut to 10 cm×10 cm and measured for mass, and the mass was divided by the area to determine the areal weight of the separator. In addition, the porous substrate used for the production of the separator was cut to 10 cm×10 cm and measured for mass, and the mass was divided by the area to determine the areal weight of the porous substrate. Then, the areal weight of the porous substrate was subtracted from the areal weight of the separator to determine the total coat weight of the adhesive porous layer on both sides.

[Porosity]

The porosity of a separator was calculated by the following equation:

$$\varepsilon = \{1 - Ws/(ds*t)\} \times 100$$

wherein ε is porosity (%), Ws is areal weight (g/$m^2$), ds is true density (g/$cm^3$), and t is thickness (μm).

The porosity ε (%) of a separator formed of a laminate of a polyethylene porous substrate and a porous layer made only of a polyvinylidene fluoride resin was calculated by the following equation:

$$\varepsilon = \{1 - (Wa/0.95 + Wb/1.78)/t\} \times 100$$

wherein Wa is the areal weight of the polyethylene porous substrate (g/$m^2$), Wb is the weight of the polyvinylidene fluoride resin (g/$m^2$), and t is the thickness of the separator (μm).

[Gurley Number]

The Gurley number (sec/100 cc) was measured in accordance with JIS P8117 using a Gurley densometer (G-B2C manufactured by Toyo Seiki).

[Thermal Expansion Coefficient, Thermal Contraction Coefficient]

A porous substrate and a separator were cut to 18 cm (MD direction)×6 cm (TD direction) to give a sample for measurement. On a line bisecting the TD direction, two points 2 cm and 17 cm from one end were marked (point A and point B). In addition, on a line bisecting the MD direction, two points 1 cm and 5 cm from one end were marked (point C and point D). A position between the end nearest to the point A and the point A was clipped. In an oven at 105° C., the sample was hung such that the MD direction was the direction of gravity, and heat-treated under no tension for 30 minutes. After the heat treatment, the sample was taken out from the oven, and the lengths between A and B and between C and D were measured. Thermal expansion coefficient (%) and thermal contraction coefficient (%) were calculated by the following equations.

Thermal expansion coefficient in the TD direction (%)=(length between C and D after heat treatment−length between C and D before heat treatment)/(length between C and D before heat treatment)×100

Thermal contraction coefficient in the MD direction (%)=(length between A and B before heat treatment−length between A and B after heat treatment)/(length between A and B before heat treatment)×100

Example 1

[Production of Separator]

As a polyvinylidene fluoride resin, a vinylidene fluoride/hexafluoropropylene copolymer (98.9/1.1 [molar ratio], weight average molecular weight: 1,950,000) was prepared.

The polyvinylidene fluoride resin was dissolved to a concentration of 5 mass % in a mixed solvent of dimethylacetamide and tripropylene glycol (dimethylacetamide/tripropylene glycol=7/3 [mass ratio]) to give a coating liquid.

Both sides of a polyethylene microporous membrane (thickness: 9 μm, Gurley number: 160 sec/100 cc, porosity: 43%, thermal expansion coefficient in the TD direction: 1.2%) were coated with the same amount of the coating liquid, followed by immersion in a coagulation liquid at 40° C. (water/dimethylacetamide/tripropylene glycol=57/30/13 [mass ratio]) to cause solidification.

It was then washed with water and dried to give a separator having an adhesive porous layer made of a polyvinylidene fluoride resin formed on both sides of a polyolefin microporous membrane.

[Production of Nonaqueous Electrolyte Battery]

(Production of Negative Electrode)

300 g of artificial graphite as a negative electrode active material, 7.5 g of an aqueous dispersion containing 40 mass % a modified styrene-butadiene copolymer as a binder, 3 g of carboxymethyl cellulose as a thickener, and an appropriate amount of water were stirred in a double-arm mixer to prepare a slurry for a negative electrode. The slurry for a negative electrode was applied to a copper foil having a thickness of 10 μm as a negative electrode collector, dried, and then pressed to give a negative electrode having a negative electrode active material layer.

(Production of Positive Electrode)

89.5 g of a lithium cobalt oxide powder as a positive electrode active material, 4.5 g of acetylene black as an electrically conductive auxiliary, and 6 g of polyvinylidene fluoride as a binder were dissolved in N-methyl-pyrrolidone (NMP) to a polyvinylidene fluoride concentration of 6 mass %, and stirred in a double-arm mixer to prepare a slurry for a positive electrode. The slurry for a positive electrode was applied to an aluminum foil having a thickness of 20 μm as a positive electrode collector, dried, and then pressed to give a positive electrode having a positive electrode active material layer.

(Production of Battery)

A lead tab was welded to the positive electrode and the negative electrode, and the positive electrode, the separator, and the negative electrode were laminated in this order to form a laminate. The laminate was inserted into a pack formed from an aluminum laminate film, and further an electrolyte was injected to impregnate the laminate with the electrolyte. As the electrolyte, 1 M LiPF$_6$-ethylene carbonate/ethylmethyl carbonate (mass ratio: 3/7) was used.

Subsequently, using a vacuum sealer, a vacuum condition was created in the pack for temporary sealing. The entire pack was hot-pressed using a hot press in the laminating direction of the laminate, whereby the electrodes and the separator were bonded together, and also the pack was sealed. The conditions for hot pressing were as follows: load per cm$^2$ of electrode: 20 kg, temperature: 90° C., pressing duration: 2 minutes.

Example 2

A separator was produced in the same manner as in Example 1, except that the polyethylene microporous membrane in Example 1 was changed to a different polyethylene microporous membrane (thickness: 9 µm, Gurley number: 205 sec/100 cc, porosity: 40%, thermal expansion coefficient in the TD direction: 2.0%). Then, a nonaqueous electrolyte battery was produced in the same manner as in Example 1.

Example 3

A separator was produced in the same manner as in Example 1, except that the polyethylene microporous membrane in Example 1 was changed to a different polyethylene microporous membrane (thickness: 9 µm, Gurley number: 210 sec/100 cc, porosity: 38%, thermal expansion coefficient in the TD direction: 6.1%). Then, a nonaqueous electrolyte battery was produced in the same manner as in Example 1.

Example 4

A separator was produced in the same manner as in Example 1, except that the polyethylene microporous membrane in Example 1 was changed to a different polyethylene microporous membrane (thickness: 9 µm, Gurley number: 250 sec/100 cc, porosity: 35%, thermal expansion coefficient in the TD direction: 10.5%). Then, a nonaqueous electrolyte battery was produced in the same manner as in Example 1.

Comparative Example 1

A separator was produced in the same manner as in Example 1, except that the polyethylene microporous membrane in Example 1 was changed to a different polyethylene microporous membrane (thickness: 9 µm, Gurley number: 80 sec/100 cc, porosity: 55%, thermal expansion coefficient in the TD direction: −2.0%). Then, a nonaqueous electrolyte battery was produced in the same manner as in Example 1.

Comparative Example 2

A separator was produced in the same manner as in Example 1, except that the polyethylene microporous membrane in Example 1 was changed to a different polyethylene microporous membrane (thickness: 9 µm, Gurley number: 350 sec/100 cc, porosity: 28%, thermal expansion coefficient in the TD direction: 11.1%). Then, a nonaqueous electrolyte battery was produced in the same manner as in Example 1.

Examples 5 to 8

Separators were produced in the same manner as in Example 2, except that the amount of the coating liquid containing a polyvinylidene fluoride resin applied in Example 2 was changed to provide adhesive porous layers with the coat weights and thicknesses shown in Table 1. Then, nonaqueous electrolyte batteries were produced in the same manner as in Example 1.

Example 9

A separator was produced in the same manner as in Example 2, except that the polyethylene microporous membrane in Example 2 was changed to a microporous membrane having a three-layer structure of polypropylene/polyethylene/polypropylene (thickness: 12 µm, Gurley number: 425 sec/100 cc, porosity: 38%, thermal expansion coefficient in the TD direction: 1.5%). Then, a nonaqueous electrolyte battery was produced in the same manner as in Example 1.
<Evaluation>

The thickness, areal weight, porosity, Gurley number, thermal expansion coefficient, and thermal contraction coefficient of the separators of the examples and the comparative examples were measured. The results are shown in Table 1. The coat weight and thickness of an adhesive porous layer shown in Table 1 are the coat weight and thickness of a finished product.

In addition, the nonaqueous electrolyte batteries of the examples and the comparative examples were each evaluated for the following characteristics. The results are shown in Table 2. Incidentally, adhesion to electrodes, cycle characteristics, and load characteristics are the arithmetic averages of ten batteries.
[Adhesion to Electrodes]

A test battery was disassembled, and the magnitude of the force required to remove each of the negative electrode and the positive electrode from the separator was measured using a tensile tester. Taking the magnitude of the force in Example 2 as 100, adhesion was evaluated as an index. An index of 80 or more is a practically desired level.
[Short-Circuit Percentage]

Ten batteries were charged to 4.2 V and then placed in an oven, and a load of 1.5 kg was applied to an area of 5 mm 0 in the central part of the outer side of each battery. In this state, the oven was set to raise the battery temperature at 2° C./min. The temperature was raised to 150° C. and maintained for 1 hour. Then, the number of batteries that showed a rapid drop in the battery voltage near 150° C. was counted, and the proportion of the number relative to the ten batteries was taken as short-circuit percentage (%). Incidentally, it can be judged that the lower the short-circuit percentage of a battery, the higher the yield of battery production.
[Cycle Characteristics (Capacity Retention)]

Charging and discharging were repeated in an environment at 30° C., where the charge condition was constant-current constant-voltage charging at 1 C and 4.2 V, while the discharge condition was constant-current discharging at 1 C to 2.75 V cut-off. The discharge capacity at the 300$^{th}$ cycle was divided by the initial capacity, and the quotient was taken as capacity retention (%) and used as an index of cycle characteristics.
[Load Characteristics]

In an environment at 25° C., the discharge capacity when discharged at 0.2 C and the discharge capacity when discharged at 2 C were measured. The latter was divided by the former, and the quotient (%) was used as an index of load characteristics. Here, the charge condition was constant-current constant-voltage charging at 0.2 C and 4.2 V for 8 hours, while the discharge condition was constant-current discharging to 2.75 V cut-off.

TABLE 1

| | Laminated Structure of Separator | Adhesive Porous Layer | | Porous Substrate | Separator | | | | | |
|---|---|---|---|---|---|---|---|---|---|---|
| | | Coat Weight (total on both sides) [g/m²] | Thickness (on one side) [µm] | Thermal Expansion Coefficient in TD Direction [%] | Thermal Expansion Coefficient in TD Direction [%] | Thermal Contraction Coefficient in MD Direction [%] | Total Thickness [µm] | Areal Weight [g/m²] | Porosity [%] | Gurley Number [sec/100 cc] |
| Comparative Example 1 | PVdF/PE/PVdF | 2.3 | 1.3 | −2.0 | −1.0 | 2.3 | 11.6 | 6.1 | 54 | 135 |
| Example 1 | PVdF/PE/PVdF | 2.3 | 1.3 | 1.2 | 0.3 | 3.6 | 11.6 | 7.2 | 45 | 206 |
| Example 2 | PVdF/PE/PVdF | 2.3 | 1.3 | 2.0 | 1.3 | 5.6 | 11.6 | 7.4 | 42 | 255 |
| Example 3 | PVdF/PE/PVdF | 2.3 | 1.3 | 6.1 | 5.2 | 10.5 | 11.6 | 7.6 | 41 | 273 |
| Example 4 | PVdF/PE/PVdF | 2.3 | 1.3 | 10.5 | 8.9 | 30.5 | 11.6 | 7.9 | 38 | 298 |
| Comparative Example 2 | PVdF/PE/PVdF | 2.3 | 1.3 | 11.1 | 10.5 | 38.5 | 11.6 | 8.5 | 33 | 430 |
| Example 5 | PVdF/PE/PVdF | 0.8 | 0.4 | 2.0 | 1.9 | 5.9 | 9.8 | 5.9 | 41 | 245 |
| Example 6 | PVdF/PE/PVdF | 1.2 | 0.7 | 2.0 | 1.7 | 5.9 | 10.4 | 6.3 | 42 | 250 |
| Example 2 | PVdF/PE/PVdF | 2.3 | 1.3 | 2.0 | 1.3 | 5.6 | 11.6 | 7.4 | 42 | 255 |
| Example 7 | PVdF/PE/PVdF | 3.0 | 1.6 | 2.0 | 1.2 | 4.3 | 12.2 | 8.1 | 42 | 265 |
| Example 8 | PVdF/PE/PVdF | 6.8 | 4.1 | 2.0 | 0.4 | 3.2 | 17.2 | 11.9 | 47 | 290 |
| Example 9 | PVdF/(PP/PE/PP)/PVdF | 2.3 | 1.3 | 1.5 | 1.0 | 5.8 | 14.6 | 8.3 | 44 | 504 |

TABLE 2

| | Evaluation | | | | |
|---|---|---|---|---|---|
| | Adhesion to Electrodes Negative Electrode-Separator [Index] | Adhesion to Electrodes Positive Electrode-Separator [Index] | Short-Circuit Percentage [%] | Cycle Characteristics [%] | Load Characteristics [%] |
| Comparative Example 1 | 101 | 97 | 30 | 90 | 95 |
| Example 1 | 103 | 98 | 0 | 90 | 94 |
| Example 2 | 100 | 100 | 0 | 88 | 94 |
| Example 3 | 99 | 101 | 0 | 87 | 93 |
| Example 4 | 101 | 100 | 0 | 85 | 93 |
| Comparative Example 2 | 100 | 99 | 20 | 53 | 62 |
| Example 5 | 80 | 81 | 0 | 87 | 95 |
| Example 6 | 88 | 93 | 0 | 88 | 94 |
| Example 2 | 100 | 100 | 0 | 88 | 94 |
| Example 7 | 113 | 115 | 0 | 89 | 93 |
| Example 8 | 153 | 173 | 0 | 43 | 54 |
| Example 9 | 101 | 102 | 0 | 76 | 85 |

As is clear from Table 2, the separators of Examples 1 to 9 had excellent adhesion to electrodes. In addition, the short-circuit percentages of the batteries produced using the separators of Examples 1 to 9 were low. Thus, the separators of Examples 1 to 9 allowed for battery production with high yield.

Example 10

Using a mixture of a styrene-butadiene copolymer:carboxymethyl cellulose:water=3:2:95 [mass ratio] as a coating liquid, both sides of the polyethylene microporous membrane used in Example 1 were coated with the same amount of the coating liquid, and dried to give a separator including an adhesive porous layer made of a styrene-butadiene copolymer. Then, a nonaqueous electrolyte battery was produced in the same manner as in Example 1.

The produced separator and nonaqueous electrolyte battery were evaluated for adhesion to electrodes, short-circuit percentage, cycle characteristics, and load characteristics. The obtained results were at the same level as in Example 1.

The invention claimed is:

1. A separator for a nonaqueous electrolyte battery, comprising a porous substrate and an adhesive porous layer that is provided on one side or both sides of the porous substrate and contains an adhesive resin, wherein
   the adhesive resin includes a polyvinylidene fluoride resin having a weight average molecular weight within a range of from 1,000,000 to 3,000,000,
   the separator has a thermal expansion coefficient of from 1% to 10% in the width direction when heat-treated at 105° C. for 30 minutes,
   the porous substrate has a thermal expansion coefficient of from 1% to 10% in the width direction when heat-treated at 105° C. for 30 minutes,
   the separator has a thermal contraction coefficient of 0% or more and 15% or less in the length direction when heat-treated at 105° C. for 30 minutes, and
   a coat weight of the polyvinylidene fluoride resin of the adhesive porous layer on one side of the porous substrate is from 0.5 g/m to 1.5 g/m.

2. The separator for a nonaqueous electrolyte battery according to claim 1, wherein the porous substrate has a thermal expansion coefficient of from 1% to 8% in the width direction when heat-treated at 105° C. for 30 minutes.

3. The separator for a nonaqueous electrolyte battery according to claim 1, wherein the total coat weight of the adhesive porous layer on both sides of the porous substrate is 1.0 g/m² or more and 3.0 g/m² or less, and the thickness of the porous layer on one side of the porous substrate is 0.5 µm or more and 4 µm or less.

4. The separator for a nonaqueous electrolyte battery according to claim 1, wherein:
   the porous substrate is selected from the group consisting of microporous membranes, porous sheets made of a fibrous material, and composite porous sheets,
   the adhesive porous layer is coated on the porous substrate in a total coat weight of 1.0 g/m² to 3.0 g/m², and
   the adhesive porous layer on one side of the porous substrate has a thickness of 0.5 µm to 4 µm.

5. The separator for a nonaqueous electrolyte battery according to claim 4, wherein the porous substrate is a polyolefin microporous membrane.

6. A nonaqueous electrolyte battery comprising a positive electrode, a negative electrode, and the separator of claim 1 for a nonaqueous electrolyte battery disposed between the positive electrode and the negative electrode,
    an electromotive force thereof being obtained by lithium doping/dedoping.

7. A method for producing a nonaqueous electrolyte battery, comprising:
    a laminating step of disposing the separator of claim 1 for a nonaqueous electrolyte battery between a positive electrode and a negative electrode to form a laminate;
    a packaging step of placing the laminate and an electrolyte in an outer casing material to form a package;
    a hot-pressing step of heating and pressurizing the package at a temperature of 80° C. or more and 100° C. or less in the laminating direction of the positive electrode, the separator for a nonaqueous electrolyte battery, and the negative electrode in the laminate; and
    a sealing step of sealing the package.

* * * * *